United States Patent
Yang et al.

(10) Patent No.: US 12,060,377 B2
(45) Date of Patent: *Aug. 13, 2024

(54) HIGH PURITY TIN COMPOUNDS CONTAINING UNSATURATED SUBSTITUENT AND METHOD FOR PREPARATION THEREOF

(71) Applicants: Gelest, Inc., Morrisville, PA (US); Mitsubishi Chemical Corporation, Tokyo (JP)

(72) Inventors: Li Yang, Belle Mead, NJ (US); Christopher Michael Caroff, Yardley, PA (US)

(73) Assignees: GELEST, INC., Morrisville, PA (US); MITSUBISHI CHEMICAL CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/232,945

(22) Filed: Aug. 11, 2023

(65) Prior Publication Data

US 2024/0059716 A1   Feb. 22, 2024

Related U.S. Application Data

(60) Provisional application No. 63/465,919, filed on May 12, 2023, provisional application No. 63/397,541, filed on Aug. 12, 2022.

(51) Int. Cl.
*C07F 7/22* (2006.01)
*C09D 7/63* (2018.01)

(52) U.S. Cl.
CPC .............. *C07F 7/2224* (2013.01); *C09D 7/63* (2018.01)

(58) Field of Classification Search
None
See application file for complete search history.

(56) References Cited

U.S. PATENT DOCUMENTS

| | | |
|---|---|---|
| 2,592,926 A | 4/1952 | Mack et al. |
| 2,602,651 A | 7/1952 | Cannon |
| 3,417,116 A | 12/1968 | Considine et al. |
| 3,470,220 A | 9/1969 | Moedritzer et al. |
| 3,519,666 A | 7/1970 | Pellegrini et al. |
| 3,590,060 A | 6/1971 | Murch |
| 3,976,672 A | 8/1976 | Strunk et al. |
| 4,370,028 A | 1/1983 | Bernhardt |
| 4,556,725 A | 12/1985 | Kanner et al. |
| 4,696,837 A | 9/1987 | Lindner |
| 5,123,998 A | 6/1992 | Kishimura |
| 5,274,149 A | 12/1993 | Calbick et al. |
| 5,698,262 A | 12/1997 | Soubeyrand et al. |
| 6,022,822 A | 2/2000 | Noyori |
| 6,162,756 A | 12/2000 | Friebe et al. |
| 6,271,329 B1 | 8/2001 | Kristen et al. |
| 6,861,544 B1 | 3/2005 | Curran et al. |
| 6,984,591 B1 | 1/2006 | Buchanan et al. |
| 7,045,451 B2 | 5/2006 | Shenai-Khatkhate et al. |
| 7,384,872 B2 | 6/2008 | Hwang et al. |
| 7,413,776 B2 | 8/2008 | Shenai-Khatkhate et al. |
| 7,683,004 B2 | 3/2010 | Feldman et al. |
| 7,745,102 B2 | 6/2010 | Fedynyshyn et al. |
| 7,767,840 B2 | 8/2010 | Shenai-Khatkhate et al. |
| 7,919,423 B2 | 4/2011 | Feldman et al. |
| 8,008,518 B2 | 8/2011 | Shinohata et al. |
| 8,415,000 B2 | 4/2013 | Stowers et al. |
| 8,454,928 B2 | 6/2013 | Dussarrat |
| 8,563,231 B2 | 10/2013 | Wang et al. |
| 8,901,335 B2 | 12/2014 | Modtland et al. |
| 9,085,594 B2 | 7/2015 | Modtland et al. |
| 9,310,684 B2 | 4/2016 | Meyers et al. |
| 10,732,505 B1 | 8/2020 | Meyers et al. |
| 10,787,466 B2 | 9/2020 | Edson et al. |
| 10,862,199 B1 | 12/2020 | Zhang et al. |
| 11,079,676 B2 | 8/2021 | Asano et al. |

(Continued)

FOREIGN PATENT DOCUMENTS

| | | |
|---|---|---|
| CA | 3080934 A1 | 10/2019 |
| CN | 102212079 A | 10/2011 |

(Continued)

OTHER PUBLICATIONS

Jousseaume et al. "General Routes to Functional Organotin Trichlorides and Trialkoxides Involving the Tricyclohexylstannyl Group" Organometallics, vol. 14, No. 2, pp. 685-689. (Year: 1995).*

Tuyen et al., "Nanomechanical and Material Properties of Fluorine-Doped Tin Oxide Thin Films Prepared by Ultrasonic Spray Pyrolysis: Effects of F-Doping," Materials, vol. 12, No. 10, 1665, pp. 1-12 (2019).

Cardineau et al., "EUV Resists based on Tin-Oxo Clusters," Proc. of SPIE, Advances in Patterning Materials and Processes XXXI, vol. 9051, pp. 90511B-1-90511B-12 (2014).

Haitjema et al., "Extreme ultraviolet patterning of tin-oxo cages," Journal of Micro/Nanolithography, MEMS, and MOEMS, vol. 16, No. 3, pp. 033510-1-033510-8 (2017).

Zhang et al., "The characterization of fluorine doped tin oxide films by Fourier Transformation Infrared spectrum," Materials Letters, vol. 64, pp. 2707-2709 (2010).

(Continued)

*Primary Examiner* — Joseph R Kosack
(74) *Attorney, Agent, or Firm* — Panitch Schwarze Belisario & Nadel LLP

(57) ABSTRACT

Monoorgano tin trialkoxide compounds having chemical formula R'Sn(OR)$_3$ and containing less than about 5 mol % diorgano tin dialkoxide are described. R' is a linear or branched, optionally fluorinated, unsaturated hydrocarbon group having about 2 to about 20 carbon atoms and each R is independently a linear or branched, optionally fluorinated, alkyl group having about 1 to about 10 carbon atoms. Methods for synthesizing and purifying these compounds are also provided. The monoorgano tin compounds may be used for the formation of high-resolution EUV lithography patterning precursors and are attractive due to their high purity and minimal concentration of diorgano tin impurities.

30 Claims, 1 Drawing Sheet

(56) References Cited

U.S. PATENT DOCUMENTS

| | | |
|---|---|---|
| 11,156,915 B2 | 10/2021 | Tsubaki et al. |
| 11,300,876 B2 | 4/2022 | Jiang et al. |
| 11,459,656 B1 | 10/2022 | Arkles et al. |
| 11,500,284 B2 | 11/2022 | Meyers et al. |
| 11,697,660 B2 | 7/2023 | Kuiper et al. |
| 2001/0001796 A1 | 5/2001 | Lynch et al. |
| 2003/0015249 A1 | 1/2003 | Jursich |
| 2004/0077892 A1 | 4/2004 | Arkles et al. |
| 2004/0202956 A1 | 10/2004 | Takahashi et al. |
| 2009/0155546 A1 | 6/2009 | Yamashita et al. |
| 2010/0270296 A1 | 10/2010 | Rauleder et al. |
| 2011/0070371 A1 | 3/2011 | Gessert et al. |
| 2011/0166268 A1 | 7/2011 | Deelman et al. |
| 2011/0171382 A1 | 7/2011 | Gardiner et al. |
| 2011/0212629 A1 | 9/2011 | Ivanov et al. |
| 2011/0251354 A1 | 10/2011 | Marechal |
| 2012/0070613 A1 | 3/2012 | Stowers et al. |
| 2012/0223418 A1 | 9/2012 | Stowers et al. |
| 2014/0119977 A1 | 5/2014 | Gatineau et al. |
| 2015/0056542 A1 | 2/2015 | Meyers et al. |
| 2015/0064839 A1 | 3/2015 | Choi et al. |
| 2015/0221519 A1 | 8/2015 | Marks et al. |
| 2016/0116839 A1 | 4/2016 | Meyers et al. |
| 2017/0102612 A1 | 4/2017 | Meyers et al. |
| 2019/0310552 A1 | 10/2019 | Asano et al. |
| 2019/0315781 A1 | 10/2019 | Edson et al. |
| 2019/0337969 A1 | 11/2019 | Odedra et al. |
| 2019/0354010 A1 | 11/2019 | Minegishi et al. |
| 2019/0391486 A1 | 12/2019 | Jiang et al. |
| 2020/0239498 A1 | 7/2020 | Clark et al. |
| 2020/0241413 A1 | 7/2020 | Clark et al. |
| 2020/0348591 A1 | 11/2020 | Kim et al. |
| 2020/0356000 A9 | 11/2020 | Minegishi et al. |
| 2021/0013034 A1 | 1/2021 | Wu et al. |
| 2021/0214379 A1 | 7/2021 | Odedra et al. |
| 2022/0153763 A1 | 5/2022 | Ermert et al. |
| 2022/0187705 A1 | 6/2022 | Jiang et al. |
| 2022/0242888 A1 | 8/2022 | Kuiper et al. |
| 2022/0402945 A1 | 12/2022 | Ermert et al. |
| 2022/0402946 A1 | 12/2022 | Sim et al. |
| 2023/0095666 A1 | 3/2023 | Arkles et al. |
| 2023/0098280 A1 | 3/2023 | Kuiper |
| 2023/0126125 A1 | 4/2023 | Ermert et al. |
| 2023/0143592 A1 | 5/2023 | Jiang et al. |
| 2023/0203068 A1 | 6/2023 | Pan et al. |
| 2023/0279546 A1 | 9/2023 | Arkles et al. |
| 2023/0303596 A1 | 9/2023 | Ermert et al. |
| 2023/0374338 A1 | 11/2023 | Jilek et al. |
| 2023/0391803 A1 | 12/2023 | Ermert et al. |
| 2023/0391804 A1 | 12/2023 | Yang et al. |
| 2024/0002412 A1 | 1/2024 | Ermert et al. |

FOREIGN PATENT DOCUMENTS

| | | |
|---|---|---|
| CN | 103172653 A | 6/2013 |
| EP | 1166900 A2 | 1/2002 |
| EP | 1491492 A1 | 12/2004 |
| EP | 1760085 A1 | 3/2007 |
| EP | 1983073 A1 | 10/2008 |
| JP | 2002371084 A | 12/2002 |
| JP | 2006159090 A | 6/2006 |
| JP | 2008-091215 A | 4/2008 |
| JP | 2012203061 A | 10/2012 |
| JP | 2013143527 A | 7/2013 |
| JP | 2020122959 A | 8/2020 |
| JP | 2021-528536 A | 10/2021 |
| KR | 20210103950 A | 8/2021 |
| TW | 223619 B | 5/1994 |
| TW | 201831570 A | 9/2018 |
| TW | 202006168 A | 2/2020 |
| TW | 1752308 B | 1/2022 |
| TW | 202230049 A | 8/2022 |
| TW | 202246293 A | 12/2022 |
| WO | 8607615 A1 | 12/1986 |
| WO | 8705037 A1 | 8/1987 |
| WO | 0195690 A1 | 12/2001 |
| WO | 0214328 A1 | 2/2002 |
| WO | 2003091186 A2 | 11/2003 |
| WO | 2009138474 A1 | 11/2009 |
| WO | 2012012026 A2 | 1/2012 |
| WO | 2013143745 A1 | 10/2013 |
| WO | 2013172466 A1 | 11/2013 |
| WO | 2014025937 A1 | 2/2014 |
| WO | 2017066319 A2 | 4/2017 |
| WO | 2017156388 A1 | 9/2017 |
| WO | 2018031896 A1 | 2/2018 |
| WO | 2018123388 A1 | 7/2018 |
| WO | 2018139109 A1 | 8/2018 |
| WO | 2019199467 A1 | 10/2019 |
| WO | 2020102085 A1 | 5/2020 |
| WO | 2020264557 A1 | 12/2020 |
| WO | 2022046736 A1 | 3/2022 |
| WO | 2022165381 A1 | 8/2022 |
| WO | 2023209506 A1 | 11/2023 |
| WO | 2023235534 A1 | 12/2023 |

OTHER PUBLICATIONS

Sakai et al., "Progress in metal organic cluster EUV photoresists," J. Vac. Sci. Technol. B, vol. 36, No. 6, pp. 06J504-1-06J504-3 (2018).

Eujen et al., "Preparation and Properties of Trifluoromethyl-Substituted Stannanes," J. Organomet. Chem., vol. 434, No. 2, pp. 159-168 (1992) (Abstract Only).

Fallica et al., "Absorption coefficient and exposure kinetics of photoresists at EUV," Proc. of SPIE, vol. 10143, pp. 101430A-1-101430A-11 (2017).

Stanley et al., "Atmospheric pressure chemical vapour deposition of fluorine-doped tin(IV) oxide from fluoroalkyltin precursors," Applied Organometallic Chemistry, vol. 19, pp. 644-657 (2005).

Molloy, K. C., "Precursors for the formation of tin(IV) oxide and related materials," Journal of Chemical Research, pp. 549-554 (2008).

Khrustalev et al., "New stable germylenes, stannylenes, and related compounds. 8. Amidogermanium(II) and -tin(II) chlorides R2N-E14-Cl (E14=Ge, R=Et; E14=Sn, R=Me) revealing new structural motifs," Applied Organometallic Chemistry, vol. 21, pp. 551-556 (2007).

International Search Report and Written Opinion dated Jun. 10, 2022 in International Application No. PCT/US2021/056936.

Office Action dated Feb. 11, 2022 in U.S. Appl. No. 17/512,944, by Arkles.

Search Report dated Aug. 19, 2022 in TW Application No. 110141022.

Hänssgen et al., "Synthese der ersten mono-t-butylzinn-elementverbindungen," Journal of Organometallic Chemistry, vol. 293, pp. 191-195 (1985).

Jones et al., "Amino-derivatives of Metals and Metalloids. Part I. Preparation of Aminostannanes, Stannylamines, and Stannazanes," J. Chem. Soc., pp. 1944-1951 (1965).

Lorberth, J., "Spaltung der zinn-stickstoff-bindung: (dialkylamino)-stannane und ihre reaktionen mit alkylierungsmitteln," Journal of Organometallic Chemistry, vol. 16, No. 2, pp. 235-248 (1969).

Van Den Berghe et al., "A study of the 1H and 119Sn NMR spectra of (CH3)4-nSn(NR2)n compounds (R=CH3, C2H5)," Journal of Organometallic Chemistry, vol. 61, pp. 197-205 (1973).

Jousseaume et al., "General Routes to Functional Organotin Trichlorides and Trialkoxides Involving the Tricyclohexylstannyl Group," Organometallics, vol. 14, pp. 685-689 (1995).

Brown et al., "Organoboranes for synthesis. 9. Rapid reaction of organoboranes with iodine under the influence of base. A convenient procedure for the conversion of alkenes into iodides via hydroboration," Tetrahedron, vol. 44, No. 10, pp. 2751-2762 (1988).

Cochran et al., "Kinetics of the Protodestannylation of Vinyltrialkyltins and Substituted Vinyltrialkyltins," Organometallics, vol. 1, No. 4, pp. 586-590 (1982).

Cannon Instrument Company, "Cannon Catalog 2007-2008: Innovations in Viscosity Measurement," pp. 1-74.

(56) References Cited

OTHER PUBLICATIONS

Warner E., "Atomic Layer Deposition of Tin Oxide and Zinc Tin Oxide: Understanding the Reactions of Alkyl Metal Precursors with Ozone," A Dissertation Submitted to the Faculty of University of Minnesota, pp. i-139 (2014).
Zuiderweg, F.J., "Laboratory Manual of Batch Distillation," Interscience Publishers, Inc., pp. v-viii, 1 and 74-97 (1957).
Van Mol, A.M.B., "Chemical vapour deposition of tin oxide thin films," Ph.D. Thesis, Eindhoven University of Technology, pp. 1-176(2003).
Armarego, W.L.F., "Purification of Laboratory Chemicals," 6th Edition, Elsevier Inc., pp. xii-743 (2009).
Del Re et al., "Low-LER Tin Carboxylate Photoresists using EUV," Extreme Ultraviolet (EUV) Lithography VI, Proc. of SPIE, vol. 9422 (2015).
Cardineau et al., "Photolithographic properties of tin-oxo clusters using extreme ultraviolet light (13.5 nm)," Microelectronic Engineering, vol. 127, pp. 44-50 (2014).
Seyferth, D., "The Grignard Reagents," Organometallics, vol. 28, No. 6, pp. 1598-1605 (2009).
Barreca et al., "MOCVD of SnO2 thin films from a new organometallic precursor," J. Phys. IV France, vol. 9, pp. Pr8-667-Pr8-673 (1999).
Pigarev et al., "The effect of substituents on the structure and reactivity of organogermanium anions," Journal of Organometallic Chemistry, vol. 369, pp. 29-41 (1989).
Tansjo, L., "N-Substituted Alkyltriaminosilanes," ACTA Chemica Scandinavica, vol. 11, No. 10, pp. 1613-1621 (1957).
Wiley-VCH Verlag Gmbh & Co. KGaA, "Distillates (petroleum)(, hydrotreated light," The MAK Collection for Occupational Health and Safety, pp. 1791-1803 (2016).
Office Action dated Mar. 15, 2023 in TW Application No. 110141022 (partial translation).
Search Report dated Mar. 9, 2023 in TW Application No. 110141022.
Office Action dated Nov. 20, 2023 in U.S. Appl. No. 18/205,009 by Yang et al.
Office Action dated Dec. 1, 2023 in U.S. Appl. No. 18/373,404, by Yang.
Ossig et al., "Synthesis and X-ray Crystal Structure of a Stannaimine," Journal of the Chemical Society, Chemical Communications, pp. 497-499 (1993).
International Search Report and Written Opinion dated Oct. 5, 2023 in Int'l Application No. PCT/US2023/024227.
Lorberth et al., "Evidence for Sn—N pi-Bonding: Dipole Moments of Aminostannanes," Journal of Organometallic Chemistry, vol. 19, pp. 203-206 (1969).
International Search Report and Written Opinion dated Jan. 16, 2024 in Int'l Application No. PCT/US2023/030045.
Pratihar et al.,"Reactivity and Selectivity of Organotin Reagents in Allylation and Arylation: Nucleophilicity Parameter as a Guide," Organometallics, vol. 30, No. 12, pp. 3257-3269 (2011).
Furniss et al., "Vogel's Textbook of Practical Organic Chemistry: Experimental Techniques," John Wiley & Sons, Inc., New York, pp. 169-190 (1989).
International Search Report and Written Opinion issued Feb. 5, 2024 in Int'l Application No. PCT/US2023/033801.
Office Action issued Mar. 8, 2024 in U.S. Appl. No. 18/205,009 by Yang et al.
Office Action issued Mar. 26, 2024 in TW Application No. 112130357.
Office Action issued Apr. 8, 2024 in TW Application No. 112120747.

* cited by examiner

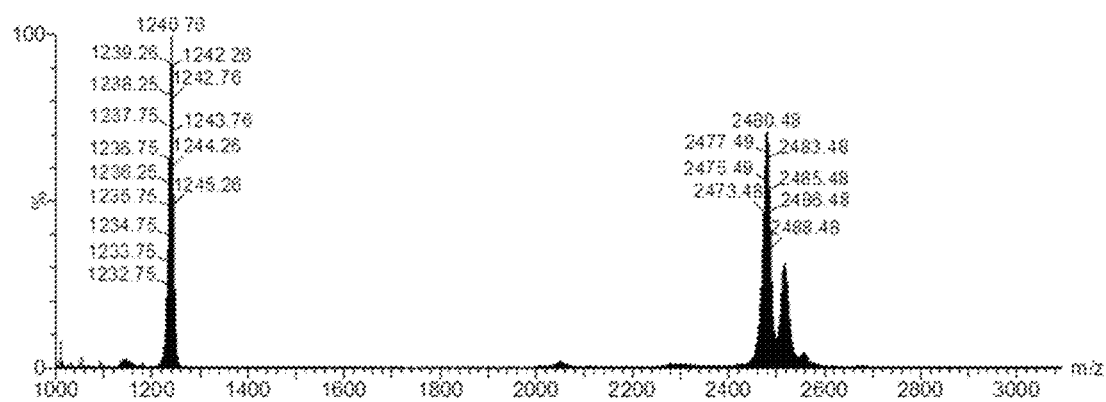

HIGH PURITY TIN COMPOUNDS CONTAINING UNSATURATED SUBSTITUENT AND METHOD FOR PREPARATION THEREOF

CROSS-REFERENCE TO RELATED APPLICATION

This application claims priority to U.S. Provisional Application No. 63/397,541, filed Aug. 12, 2022, and U.S. Provisional Application No. 63/465,919, filed May 12, 2023, the disclosures of which are herein incorporated by reference in their entireties.

BACKGROUND OF THE INVENTION

As semiconductor fabrication continues to advance, feature sizes continue to shrink, driving the need for new processing methods. Certain organotin compounds have been shown to be useful in the deposition of tin oxide hydroxide coatings in applications such as extreme ultraviolet (EUV) lithography techniques. For example, tin compounds containing unsaturated substituents provide radiation sensitive Sn—C bonds that can be used to pattern structures lithographically.

Materials used in microelectronic fabrication are required to be extremely pure with tight limits placed on organic contamination (e.g., reaction by-products), metallic contamination, and particulate contamination. Purity requirements are stringent in general, and particularly for lithography applications because the chemical is in contact with the semiconductor substrates and the organometallic impurities in compounds such as diisopropylbis(dimethylamino) tin, $(iPr)_2Sn(NMe_2)_2$, can affect the properties of the resultant film. Exact targets for purities are determined by a variety of factors, including performance metrics, but typical minimum purity targets are 3N+. Residual metals present in the chemicals can be deposited onto the semiconductor substrate and degrade the electrical performance of the device being fabricated. Typical specifications for metals are less than 10 ppb for individual metals and total metal not to exceed ~100 ppb.

The processing and performance of semiconductor materials may also be sensitive to dialkyl tin contaminants. Dialkyl tin impurities such as $R_2Sn(NMe_2)_2$, where R is an alkyl group, are the source of off-gassing after vapor phase deposition or spin-on coating processes due to the oxostannate cluster films being less dense when the film contains dialkyl groups. To produce microelectronic products using EUV lithography, proper control of dialkyl tin contaminants is required. The high purity required from the mono-alkyl tin precursor manufacturing process becomes a challenge. In general, the syntheses of monoalkyl tin triamides have previously employed lithium dimethylamide reagents reacted with alkyl tin trichloride, or followed by a lithium/Grignard reagent (alkylating agent) to convert the tin tetraamides to the desired triamides.

However, similar synthetic methods are not applicable for the synthesis of tin compounds containing unsaturated substituents such as vinyl, allyl, or alkenyl. Rather, the lithium dimethyl amide strong base will react not only with the tin-chlorine bond, but also with the double or triple bond on the organic substituent. Further, primary and secondary monoorgano tin compounds cannot be synthesized from an alkylating agent and a tetraamide even when using the correct stoichiometry: a primary alkylating agent will convert a tin tetraamide to a trialkyltin amide and unreacted tetraamide, and a secondary alkylating agent will convert a tin tetraamide to polyalkyl tin compounds.

Further, monoalkenyl tin trialkoxides cannot be prepared via the reaction of the corresponding tin triamide with an alcohol, and reaction of an organotin trichloride with dialkylamine followed by reaction with alcohol leads to a mixture of products.

Graf ("Tin, Tin Alloys, and Tin Compounds," Ullmann's Encyclopedia of Industrial Chemistry; Weinheim: Wiley-VCH (2005)) reports the preparation of monoorgano tin trichlorides containing vinyl or allyl substituents without a catalyst or heat using Kocheshkov comproportionation; the electron donating group enables the comproportionation. As a result, the unsaturated/electron donating group from both the alkenyl or alkoxy group may promote the Kocheshkov-like comproportionation during the reaction especially when preparing mono-vinyl or mono-allyl tin trialkoxy compounds according to scheme (I), shown below, and the disproportion during purification scheme (II), resulting in a mixture of products.

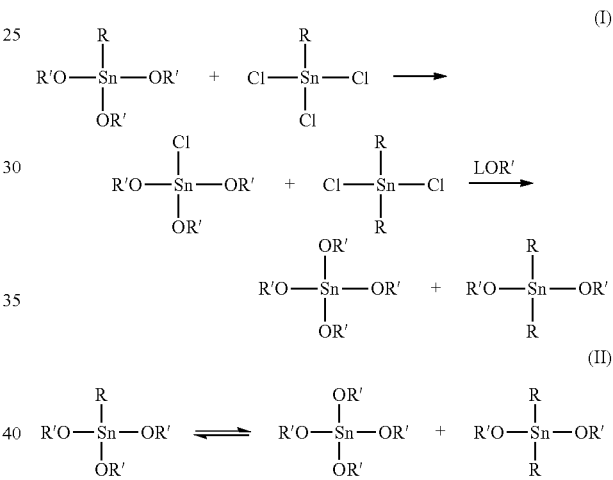

The ability to prepare and isolate trialkoxy tin compounds containing an unsaturated group and having desired high purity levels has not previously been reported. Such high purity tin compounds would be very attractive for use in the microelectronic industry.

SUMMARY OF THE INVENTION

In one embodiment, aspects of the disclosure relate to a monoorgano tin trialkoxide compound having formula (1) having a purity of at least about 95 mol % and containing less than about 5 mol % of a diorgano tin dialkoxide compound having formula (2):

wherein R' is a linear or branched, optionally fluorinated, unsaturated hydrocarbon group having about 2 to about 20 carbon atoms and each R is independently a linear or branched, optionally fluorinated, alkyl group having about 1 to about 10 carbon atoms.

In a second embodiment, aspects of the disclosure relate to a monoorgano tin trialkoxide compound having formula (1):

$$R'Sn(OR)_3 \quad (1)$$

wherein R' is a linear or branched, optionally fluorinated, unsaturated hydrocarbon group having about 2 to about 20 carbon atoms and each R is independently a linear or branched, optionally fluorinated, alkyl group having about 1 to about 10 carbon atoms.

In a further embodiment, aspects of the disclosure relate to a method of synthesizing a monoorgano tin trialkoxide compound having formula (1) having a purity of at least about 95 mol % and containing less than about 5 mol % of a diorgano tin dialkoxide compound having formula (2):

$$R'Sn(OR)_3 \quad (1)$$

$$R'_2Sn(OR)_2 \quad (2)$$

wherein R' is a linear or branched, optionally fluorinated, unsaturated hydrocarbon group having about 2 to about 20 carbon atoms and each R is independently a linear or branched, optionally fluorinated, alkyl group having about 1 to about 10 carbon atoms, the method comprising reacting an alkali metal alkoxide with a R'SnX$_3$ compound, wherein X is a halogen atom or an alkoxy group.

Aspects of the disclosure further relate to a method of synthesizing a monoorgano tin trialkoxide compound having formula (1):

$$R'Sn(OR)_3 \quad (1)$$

$$R'_2Sn(OR)_2 \quad (2)$$

wherein R' is a linear or branched, optionally fluorinated, unsaturated hydrocarbon group having about 2 to about 20 carbon atoms and each R is independently a linear or branched, optionally fluorinated, alkyl group having about 1 to about 10 carbon atoms, the method comprising reacting an alkali metal alkoxide with a R'SnX$_3$ compound, wherein X is a halogen atom or alkoxy group.

Further aspects of the disclosure relate to an organotin compound having formula (3):

$$R'SnO_{(3/2-x/2)}(OH)_x \quad (3)$$

wherein 0<x<3 and R' is a linear or branched, optionally fluorinated, unsaturated hydrocarbon group having about 2 to about 20 carbon atoms.

Additional aspects of the disclosure relate to a composition comprising an organotin compound having formula (3) and an organotin compound having formula (4):

$$R'SnO_{(3/2-x/2)}(OH)_x \quad (3)$$

$$R''SnO_{(3/2-x/2)}(OH)_x \quad (4)$$

wherein 0<x<3, R' is a linear or branched, optionally fluorinated, unsaturated hydrocarbon group having about 2 to about 20 carbon atoms and R'' is an optionally substituted hydrocarbon group having about 2 to about 20 carbon atoms.

Advantageous refinements of the invention, which can be implemented alone or in combination, are specified in the dependent claims.

In summary, the following embodiments are proposed as particularly preferred in the scope of the present invention:

Embodiment 1: A monoorgano tin trialkoxide compound having formula (1) having a purity of at least about 95 mol % and containing less than about 5 mol % of a diorgano tin dialkoxide compound having formula (2):

$$R'Sn(OR)_3 \quad (1)$$

$$R'_2Sn(OR)_2 \quad (2)$$

wherein R' is a linear or branched, optionally fluorinated, unsaturated hydrocarbon group having about 2 to about 20 carbon atoms and each R is independently a linear or branched, optionally fluorinated, alkyl group having about 1 to about 10 carbon atoms.

Embodiment 2: The monoorgano tin trialkoxide compound according to Embodiment 1, wherein R' is a linear or branched, optionally fluorinated, unsaturated hydrocarbon group having 2 to about 10 carbon atoms and each R is independently a linear or branched, optionally fluorinated, alkyl group having about 1 to about 5 carbon atoms.

Embodiment 3: The monoorgano tin trialkoxide compound according to Embodiment 1 or 2, wherein the content of diorgano tin dialkoxide having formula (2) is less than about 1 mol %.

Embodiment 4: The monoorgano tin trialkoxide compound according to any of Embodiments 1-3, wherein a total content of tetrakis(alkoxy)tin is less than about 1 mol %.

Embodiment 5: The monoorgano tin trialkoxide compound according to any of Embodiments 1-4, wherein a total content of tris(alkenyl)tin compounds is less than about 1 mol %.

Embodiment 6: The monoorgano tin trialkoxide compound according to any of Embodiments 1-6, wherein R' is vinyl, allyl, 1-propenyl, 3-buten-1-yl, 3-buten-2-yl, 2-methyl allyl, or 3-methyl-2-buten-1-yl and each R is independently an optionally fluorinated methyl, ethyl, n-propyl, isopropyl, n-butyl, isobutyl, or t-butyl.

Embodiment 7: The monoorgano tin trialkoxide compound according to any of Embodiments 1-6, wherein the compound having formula (1) is selected from:

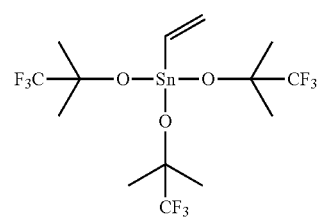

tris((1,1,1-trifluoro-2-methylpropan-2-yl)oxy)(vinyl)stannane

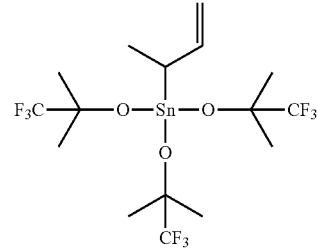

but-3-en-2-yltris((1,1,1-trifluoro-2-methylpropan-2-yl)oxy)stannane

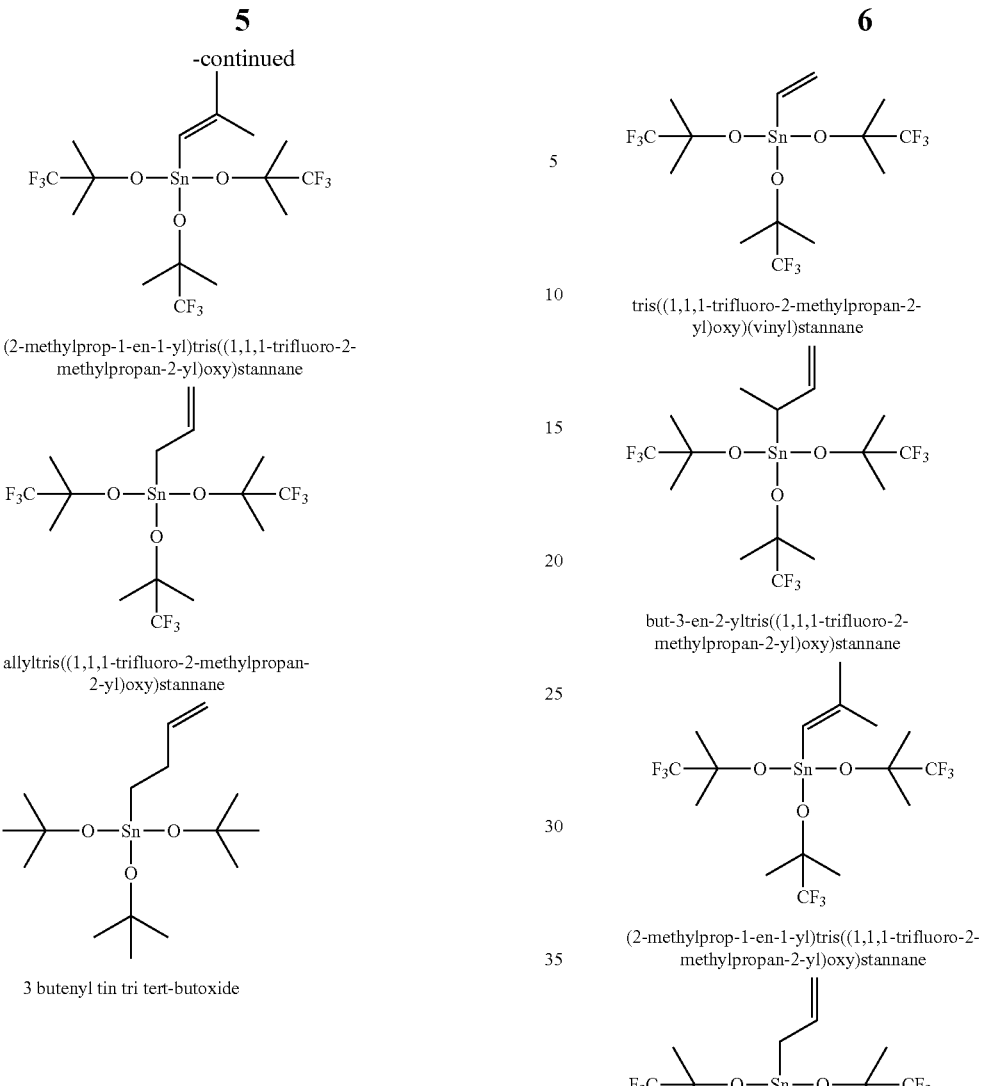

(2-methylprop-1-en-1-yl)tris((1,1,1-trifluoro-2-methylpropan-2-yl)oxy)stannane allyltris((1,1,1-trifluoro-2-methylpropan-2-yl)oxy)stannane 3 butenyl tin tri tert-butoxide tris((1,1,1-trifluoro-2-methylpropan-2-yl)oxy)(vinyl)stannane but-3-en-2-yltris((1,1,1-trifluoro-2-methylpropan-2-yl)oxy)stannane (2-methylprop-1-en-1-yl)tris((1,1,1-trifluoro-2-methylpropan-2-yl)oxy)stannane allyltris((1,1,1-trifluoro-2-methylpropan-2-yl)oxy)stannane 3 butenyl tin tri tert-butoxide Embodiment 8: A monoorgano tin trialkoxide compound having formula (1):

$$R'Sn(OR)_3 \quad (1)$$

wherein R' is a linear or branched, optionally fluorinated, unsaturated hydrocarbon group having about 2 to about 20 carbon atoms and each R is independently a linear or branched, optionally fluorinated, alkyl group having about 1 to about 10 carbon atoms.

Embodiment 9: The monoorgano tin trialkoxide compound according to Embodiment 8, wherein R' is a linear or branched, optionally fluorinated, unsaturated hydrocarbon group having 2 to about 10 carbon atoms and each R is independently a linear or branched, optionally fluorinated, alkyl group having about 1 to about 5 carbon atoms.

Embodiment 10: The monoorgano tin trialkoxide compound according to Embodiment 8 or 9, wherein R' is vinyl, allyl, 1-propenyl, 3-buten-1-yl, 3-buten-2-yl, 2-methyl allyl, or 3-methyl-2-buten-1-yl and each R is independently an optionally fluorinated methyl, ethyl, n-propyl, isopropyl, n-butyl, isobutyl, or t-butyl.

Embodiment 11: The monoorgano tin trialkoxide compound according to any of Embodiments 8-10, wherein the compound having formula (1) is selected from:

Embodiment 12: A method of synthesizing a monoorgano tin trialkoxide compound having formula (1) having a purity of at least about 95 mol % and containing less than about 5 mol % of a diorgano tin dialkoxide compound having formula (2):

$$R'Sn(OR)_3 \qquad (1)$$

$$R'_2Sn(OR)_2 \qquad (2)$$

wherein R' is a linear or branched, optionally fluorinated, unsaturated hydrocarbon group having about 2 to about 20 carbon atoms and each R is independently a linear or branched, optionally fluorinated, alkyl group having about 1 to about 10 carbon atoms, the method comprising reacting an alkali metal alkoxide with a R'SnX₃ compound, wherein X is a halogen atom or an alkoxy group.

Embodiment 13: The method according to Embodiment 12, comprising:
(a) preparing a solution of an alkali metal alkoxide;
(b) adding R'SnCl₃ at about −10° C. to about 10° C., wherein the amount of alkali metal alkoxide is at least about 3.03 equivalents relative to the amount of added R'SnCl₃, to produce a crude product; and
(c) distilling the crude product to yield a product containing monoorgano tin trialkoxide having formula (1) and no more than about 5 mol % diorgano tin dialkoxide having formula (2).

Embodiment 14: The method according to Embodiment 12 or 13, wherein the content of diorgano tin dialkoxide having formula (2) is less than about 1 mol %.

Embodiment 15: The method according to any of Embodiments 12-14, wherein a total content of tetrakis (alkoxy)tin is less than about 1 mol %.

Embodiment 16: The method according to any of Embodiments 12-15, wherein R' is vinyl, allyl, 1-propenyl, 3-buten-1-yl, 3-buten-2-yl, 2-methyl allyl, or 3-methyl-2-buten-1-yl and each R is independently an optionally fluorinated methyl, ethyl, n-propyl, isopropyl, n-butyl, isobutyl, or t-butyl.

Embodiment 17: The method according to any of Embodiments 12-16, wherein the reaction is performed in a solvent containing greater than about 50% by volume of a hydrocarbon solvent and/or an aromatic solvent.

Embodiment 18: The method according to any of Embodiments 12-17, wherein the reaction is performed substantially without light exposure.

Embodiment 19: A method of synthesizing a monoorgano tin trialkoxide compound having formula (1):

$$R'Sn(OR)_3 \qquad (1)$$

$$R'_2Sn(OR)_2 \qquad (2)$$

wherein R' is a linear or branched, optionally fluorinated, unsaturated hydrocarbon group having about 2 to about 20 carbon atoms and each R is independently a linear or branched, optionally fluorinated, alkyl group having about 1 to about 10 carbon atoms, the method comprising reacting an alkali metal alkoxide with a R'SnX₃ compound, wherein X is a halogen atom or an alkoxy group.

Embodiment 20: The method according to Embodiment 19, comprising:
(a) preparing a solution of an alkali metal alkoxide;
(b) adding R'SnCl₃ at about −10° C. to about 10° C., wherein the amount of alkali metal alkoxide is at least about 3.03 equivalents relative to the amount of added R'SnCl₃, to produce a crude product; and
(c) distilling the crude product to yield a monoorgano tin trialkoxide having formula (1).

Embodiment 21: The method according to Embodiment 19 or 20, wherein R' is vinyl, allyl, 1-propenyl, 3-buten-1-yl, 3-buten-2-yl, 2-methyl allyl, or 3-methyl-2-buten-1-yl and each R is independently an optionally fluorinated methyl, ethyl, n-propyl, isopropyl, n-butyl, isobutyl, or t-butyl.

Embodiment 22: The method according to any of Embodiments 19-21, wherein the reaction is performed in a solvent containing greater than about 50% by volume of a hydrocarbon solvent and/or an aromatic solvent.

Embodiment 23: The method according to any of Embodiment 19-22, wherein the method is performed substantially without light exposure.

Embodiment 24: A method of storing a sample of the monoorgano tin trialkoxide compound having formula (1) according to Embodiment 1, the method comprising storing the sample of the monoorgano tin trialkoxide compound having formula (1) substantively without light exposure and at a temperature of less than about 30° C.

Embodiment 25: The method according to Embodiment 24, wherein the sample of the monoorgano tin trialkoxide compound having formula (1) is stored for about three days to about one year.

Embodiment 26: The method according to Embodiment 24 or 25, wherein the sample of the monoorgano tin trialkoxide undergoes substantively no decomposition after a storage time of about three days to about one year.

Embodiment 27: The method according to any of Embodiments 24 to 26, comprising storing the compound having formula (1) in a container in an inert atmosphere.

Embodiment 28: The method according to any of Embodiments 24-27, comprising storing the compound having formula (1) in a container substantially without light exposure.

Embodiment 29: A method of storing a sample of the monoorgano tin trialkoxide compound having formula (1) according to Embodiment 8, the method comprising storing the sample of the monoorgano tin trialkoxide compound having formula (1) substantively without light exposure and at a temperature of less than about 30° C.

Embodiment 30: The method according to Embodiment 29, wherein the sample of the monoorgano tin trialkoxide compound having formula (1) is stored for about three days to about one year.

Embodiment 31: The method according to Embodiment 29 or 30, wherein the sample of the monoorgano tin trialkoxide undergoes substantively no decomposition after a storage time of about three days to about one year.

Embodiment 32: The method according to any of Embodiments 29-31, comprising storing the compound having formula (1) in a container in an inert atmosphere.

Embodiment 33: The method according to any of Embodiments 29-32, comprising storing the compound having formula (1) in a container substantially without light exposure.

Embodiment 34: An organotin compound having formula (3):

$$R'SnO_{(3/2-x/2)}(OH)_x \qquad (3)$$

wherein 0<x<3 and R' is a linear or branched, optionally fluorinated, unsaturated hydrocarbon group having about 2 to about 20 carbon atoms.

Embodiment 35: The organotin compound having formula (3) according to Embodiment 34, wherein the compound having formula (3) is obtained by hydrolysis of a compound having formula (1):

$$R'Sn(OR)_3 \qquad (1)$$

wherein each R is independently a linear or branched, optionally fluorinated, alkyl group having about 1 to about 10 carbon atoms.

Embodiment 36: A solution comprising the organotin compound having formula (3) according to Embodiment 34 or 35 and an organic solvent.

Embodiment 37: The solution according to Embodiment 36, wherein the compound having formula (3) is obtained by hydrolysis of a compound having formula (1):

  (1)

wherein each R is independently a linear or branched, optionally fluorinated, alkyl group having about 1 to about 10 carbon atoms.

Embodiment 38: A film comprising the organotin compound having formula (3) according to Embodiment 34.

Embodiment 39: The film according to Embodiment 38, wherein the compound having formula (3) is obtained by hydrolysis of a compound having formula (1):

  (1)

wherein each R is independently a linear or branched, optionally fluorinated, alkyl group having about 1 to about 10 carbon atoms.

Embodiment 40: A composition comprising the monoorgano tin trialkoxide compound having formula (1) according to Embodiment 1 and a R'SnX$_3$ compound, wherein X is a halogen atom or an alkoxy group.

Embodiment 41: A composition comprising the monoorgano tin trialkoxide compound having formula (1) according to Embodiment 8 and a R'SnX$_3$ compound, wherein X is a halogen atom or an alkoxy group.

Embodiment 42: A composition comprising an organotin compound having formula (3) and an organotin compound having formula (4):

  (3)

  (4)

wherein 0<x<3, R' is a linear or branched, optionally fluorinated, unsaturated hydrocarbon group having about 2 to about 20 carbon atoms and R" is an optionally substituted hydrocarbon group having 2 to about 20 carbon atoms,.

Embodiment 43: The composition according to Embodiment 42, wherein at least one of the compound having formula (3) and the compound having formula (4) is obtained by hydrolysis of a monoorgano tin trialkoxide compound having formula (1):

  (1)

wherein each R is independently a linear or branched, optionally fluorinated, alkyl group having about 1 to about 10 carbon atoms.

Embodiment 44: A solution comprising the composition according to Embodiment 42 or 43 and an organic solvent.

Embodiment 45: The solution according to Embodiment 44, wherein at least one of the compound having formula (3) and the compound having formula (4) is obtained by hydrolysis of a monoorgano tin trialkoxide compound having formula (1):

  (1)

wherein each R is independently a linear or branched, optionally fluorinated alkyl group having about 1 to about 10 carbon atoms.

Embodiment 46: A film comprising the composition according to Embodiment 42 or 43.

Embodiment 47: The film according to Embodiment 46, wherein at least one of the compound having formula (3) and the compound having formula (4) is obtained by hydrolysis of a monoorgano tin trialkoxide compound having formula (1):

  (1)

wherein each R is independently a linear or branched, optionally fluorinated, alkyl group having about 1 to about 10 carbon atoms.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is an ESI-Mass spectrum of a compound according to one embodiment of the disclosure.

DETAILED DESCRIPTION OF THE INVENTION

According to one aspect of the disclosure, provided are monoorgano tin trialkoxide compounds having formula (1). For the purposes of this disclosure, the term "monoorgano" refers to a substituent containing a single unsaturated primary or secondary hydrocarbon group having at least two carbon atoms, that is, one alkenyl group or one alkynyl group in a primary or secondary position with respect to tin. The compounds having formula (1) preferably have a purity of at least about 95 mol % and preferably contain no more than about 5 mol % diorgano tin dialkoxide compounds having formula (2) relative to the total amount of tin, preferably no more than about 4 mol %, no more than about 3 mol %, no more than about 2 mol %, more preferably no more than about 1 mol %, even more preferably no more than about 0.5 mol %, even more preferably no more than about 0.1 mol %.

  (1)

  (2)

In formulas (1) and (2), R' is a linear or branched, optionally fluorinated, unsaturated hydrocarbon group having about 2 to about 20 carbon atoms, preferably about 2 to about 10 carbon atoms, more preferably about 2 to about 7 carbon atoms, even more preferably about 2 to about 5 carbon atoms, most preferably about 2 to about 3 carbons, such as an alkenyl or alkynyl group, and each R is independently a linear or branched (primary, secondary, or tertiary), optionally fluorinated, alkyl group having about 1 to about 10 carbon atoms, preferably about 1 to about 5 carbon atoms, more preferably 1 to about 4 carbon atoms, such as, without limitation, optionally fluorinated methyl, ethyl, n-propyl, isopropyl, n-butyl, isobutyl, t-butyl, etc. Presently preferred R' groups include, without limitation, vinyl (ethenyl), allyl, 1-propenyl, 3-buten-1-yl, 3-buten-2-yl, 2-methyl allyl, and 3-methyl-2-buten-1-yl.

Exemplary compounds having formula (1) according to this aspect of the disclosure include, without limitation, ethenyl tin tri(methoxide), ethenyl tin tri(ethoxide), ethenyl tin tri(n-propoxide), ethenyl tin tri(i-propoxide), ethenyl tin tri(n-butoxide), ethenyl tin tri(i-butoxide), ethenyl tin tri(t-butoxide), allyl tin tri(methoxide), allyl tin tri(ethoxide), allyl tin tri(n-propoxide), allyl tin tri(i-propoxide), allyl tin tri(n-butoxide), allyl tin tri(i-butoxide), allyl tin tri(t-butoxide), 1-propenyl tin tri(methoxide), 1-propenyl tin tri(ethoxide), 1-propenyl tin tri(n-propoxide), 1-propenyl tin tri(i-propoxide), 1-propenyl tin tri(n-butoxide), 1-propenyl tin tri(i-butoxide), 1-propenyl tin tri(t-butoxide), 3-buten-1-yl tin tri(methoxide), 3-buten-1-yl tin tri(ethoxide), 3-buten-1-yl tin tri(n-propoxide), 3-buten-1-yl tin tri(i-propoxide), 3-buten-1-yl tin tri(n-butoxi de), 3-buten-1-yl tin tri(i-butoxide), 3-buten-1-yl tin tri(t-butoxide), 3-buten-2-yl tin tri(methoxide), 3-buten-2-yl tin tri(ethoxide), 3-buten-2-yl tin tri(n-propoxide), 3-buten-2-yl tin tri(i-propoxide), 3-buten-2-yl tin tri(n-butoxide), 3-buten-2-yl tin tri(i-butoxide), 3-buten-2-yl tin tri(t-butoxi de), 3-methyl-2-buten-1-yl tin tri(methoxide), 3-methyl-2-buten-1-yl tin tri(ethoxide), 3-methyl-2-buten-1-yl tin tri(n-propoxide), 3-methyl-2-buten-1-yl tin tri(i-propoxide), 3-methyl-2-buten-1-yl tin tri(n-butoxide), 3-methyl-2-buten-1-yl tin tri(i-butoxide), and 3-methyl-2-buten-1-yl tin tri(t-butoxide).

The term "optionally fluorinated" means that at least one hydrogen atom in the hydrocarbon group in R' or the alkyl group in R is replaced with a fluorine atom; it is within the scope of the invention for one, two, or even all of the hydrogen atoms in the hydrocarbon group or the alkyl group to be replaced with fluorine atoms (generally referred to as perfluorinated). Most preferably, only the R group is optionally fluorinated, so that one, two, or even all of the hydrogen atoms in the alkyl group are replaced with fluorine atoms.

Exemplary fluorinated compounds having formula (1) according to this aspect of the disclosure include, without limitation, tris(trifluoromethoxy)(vinyl)stannane, allyltris(trifluoromethoxy)stannane, ((1,1,1-trifluoro-2-methylpropan-2-yl)oxy)bis((1,1,1-trifluoropropan-2-yl)oxy)(vinyl)stannane, ((1,1,1,3,3,3-hexafluoro-2-methylpropan-2-yl)oxy)bis((1,1,1,3,3,3-hexafluoropropan-2-yl)oxy)(vinyl)stannane, allylbis((1,1,1-trifluoro-2-methylpropan-2-yl)oxy)((1,1,1-trifluoropropan-2-yl)oxy)stannane, allyl((1,1,1,3,3,3-hexafluoro-2-methylpropan-2-yl)oxy)bis((1,1,1,3,3,3-hexafluoropropan-2-yl)oxy)stannane, tris((1,1,1-trifluoro-2-methylpropan-2-yl)oxy)(vinyl)stannane, tris((1,1,1,3,3,3-hexafluoro-2-methylpropan-2-yl)oxy)(vinyl)stannane, tris((1,1,1,3,3,3-hexafluoro-2-(trifluoromethyl)propan-2-yl)oxy)(vinyl)stannane, allyltris((1,1,1-trifluoro-2-methylpropan-2-yl)oxy)stannane, allyltris((1,1,1,3,3,3-hexafluoro-2-methylpropan-2-yl)oxy)stannane, allyltris((1,1,1,3,3,3-hexafluoro-2-(trifluoromethyl)propan-2-yl)oxy)stannane, (2-methylallyl)tris((1,1,1-trifluoro-2-methylpropan-2-yl)oxy)stannane, tris((1,1,1,3,3,3-hexafluoro-2-methylpropan-2-yl)oxy)(2-methylallyl)stannane, and tris((1,1,1,3,3,3-hexafluoro-2-(trifluoromethyl)propan-2-yl)oxy)(2-methylallyl)stannane.

All numerical ranges expressed in this disclosure encompass all values within the range, including fractional and decimal amounts. Accordingly, the content of the compound having formula (2) is preferably less than about 5 mol %, less than about 4 mol %, less than about 3 mol %, less than about 2 mol %, less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol %, less than about 0.05 mol %, less than about 0.04 mol %, less than about 0.03 mol %, less than about 0.02 mol %, less than about 0.01 mol %, or non-detectable by $^{119}$Sn NMR, that is, the compound having formula (2) is in some embodiments undetectable in a sample of the compound having formula (1).

In some embodiments, the content of tetrakis(alkoxy)tin in the monoorgano tin trialkoxide compound having formula (1) is less than about 1 mol %, more preferably less than about 0.7 mol %, less than about 0.5 mol %, or less than about 0.1 mol %. In some embodiments, a total content of tris(alkenyl)tin compounds in the monoorgano tin trialkoxide compound having formula (1) is less than about 1 mol % more preferably less than about 0.7 mol %, less than about 0.5 mol %, or less than about 0.1 mol %.

According to another aspect of the disclosure, provided are monoorgano tin trialkoxide compounds having formula (1). For the purposes of this disclosure, the term "monoorgano" refers to a substituent containing a single unsaturated primary or secondary hydrocarbon group having at least two carbon atoms, that is, one alkenyl group or one alkynyl group in a primary or secondary position with respect to tin.

$$R'Sn(OR)_3 \quad (1)$$

In formula (1), R' is a linear or branched, optionally fluorinated, unsaturated hydrocarbon group having about 2 to about 20 carbon atoms, preferably about 2 to about 10 carbon atoms, more preferably about 2 to about 7 carbon atoms, even more preferably about 2 to about 5 carbon atoms, most preferably about 2 to about 3 carbons, such as an alkenyl or alkynyl group, and each R is independently a linear or branched (primary, secondary, or tertiary), optionally fluorinated, alkyl group having about 1 to about 10 carbon atoms, preferably about 1 to about 5 carbon atoms, more preferably 1 to about 4 carbon atoms, such as, without limitation, optionally fluorinated methyl, ethyl, n-propyl, isopropyl, n-butyl, isobutyl, t-butyl, etc. Presently preferred R' groups include, without limitation, vinyl (ethenyl), allyl, 1-propenyl, 3-buten-1-yl, 2-methyl allyl, 3-buten-2-yl, and 3-methyl-2-buten-1-yl.

Exemplary compounds having formula (1) according to this aspect of the disclosure include, without limitation, ethenyl tin tri(methoxide), ethenyl tin tri(ethoxide), ethenyl tin tri(n-propoxide), ethenyl tin tri(i-propoxide), ethenyl tin tri(n-butoxide), ethenyl tin tri(i-butoxide), ethenyl tin tri(t-butoxide), allyl tin tri(methoxide), allyl tin tri(ethoxide), allyl tin tri(n-propoxide), allyl tin tri(i-propoxide), allyl tin tri(n-butoxide), allyl tin tri(i-butoxide), allyl tin tri(t-butoxide), 1-propenyl tin tri(methoxide), 1-propenyl tin tri(ethoxide), 1-propenyl tin tri(n-propoxide), 1-propenyl tin tri(i-propoxide), 1-propenyl tin tri(n-butoxide), 1-propenyl tin tri(i-butoxide), 1-propenyl tin tri(t-butoxide), 3-buten-1-yl tin tri(methoxide), 3-buten-1-yl tin tri(ethoxide), 3-buten-1-yl tin tri(n-propoxide), 3-buten-1-yl tin tri(i-propoxide), 3-buten-1-yl tin tri(n-butoxide), 3-buten-1-yl tin tri(i-butoxide), 3-buten-1-yl tin tri(t-butoxide), 3-buten-2-yl tin tri(methoxide), 3-buten-2-yl tin tri(ethoxide), 3-buten-2-yl tin tri(n-propoxide), 3-buten-2-yl tin tri(i-propoxide), 3-buten-2-yl tin tri(n-butoxide), 3-buten-2-yl tin tri(i-butoxide), 3-buten-2-yl tin tri(t-butoxide), 3-methyl-2-buten-1-yl tin tri(methoxide), 3-methyl-2-buten-1-yl tin tri(ethoxide), 3-methyl-2-buten-1-yl tin tri(n-propoxide), 3-methyl-2-buten-1-yl tin tri(i-propoxide), 3-methyl-2-buten-1-yl tin tri(n-butoxide), 3-methyl-2-buten-1-yl tin tri(i-butoxide), and 3-methyl-2-buten-1-yl tin tri(t-butoxide).

The term "optionally fluorinated" means that at least one hydrogen atom in the hydrocarbon group in R' or the alkyl group in R is replaced with a fluorine atom; it is within the scope of the invention for one, two, or even all of the hydrogen atoms in the hydrocarbon group or the alkyl group to be replaced with fluorine atoms (generally referred to as perfluorinated). Most preferably, only the R group is optionally fluorinated, so that one, two, or even all of the hydrogen atoms in the alkyl group are replaced with fluorine atoms.

Exemplary fluorinated compounds having formula (1) include, without limitation, tris(trifluoromethoxy)(vinyl)stannane, allyltris(trifluoromethoxy)stannane, ((1,1,1-trifluoro-2-methylpropan-2-yl)oxy)bis((1,1,1-trifluoropropan-2-yl)oxy)(vinyl)stannane, ((1,1,1,3,3,3-hexafluoro-2-methylpropan-2-yl)oxy)bis((1,1,1,3,3,3-hexafluoropropan-2-yl)oxy)(vinyl)stannane, allylbis((1,1,1-trifluoro-2-methylpropan-2-yl)oxy)((1,1,1-trifluoropropan-2-yl)oxy)stannane, allyl((1,1,1,3,3,3-hexafluoro-2-methylpropan-2-yl)oxy)bis((1,1,1,3,3,3-hexafluoropropan-2-yl)oxy)stannane, tris((1,1,1-trifluoro-2-methylpropan-2-yl)oxy)(vinyl)stannane, tris((1,1,1,3,3,3-hexafluoro-2-methylpropan-2-yl)oxy)(vinyl)stannane, tris((1,1,1,3,3,3-hexafluoro-2-(trifluoromethyl)propan-2-yl)oxy)(vinyl)stannane, allyltris((1,1,1-trifluoro-2-methylpropan-2-yl)oxy)stannane, allyltris((1,1,1,3,3,3-hexafluoro-2-methylpropan-2-yl)oxy)stannane, allyltris((1,1,1,3,3,3-hexafluoro-2-(trifluoromethyl)propan-2-yl)oxy)stannane, (2-methylallyl)tris((1,1,1-trifluoro-2-methylpropan-2-yl)oxy)stannane, tris((1,1,1,3,3,3-hexafluoro-2-methylpropan-2-yl)oxy)(2-methylallyl)stannane, and tris((1,1,1,3,3,3-hexafluoro-2-(trifluoromethyl)propan-2-yl)oxy)(2-methylallyl)stannane.

The organometallic tin compounds having formula (1) may be used for the formation of high-resolution EUV lithography patterning precursors and are attractive due to their electron density, Sn—C bond strength, and radical formation, as well as the potential to reduce EUV dose time.

Particularly preferred compounds having formula (1) are shown below:

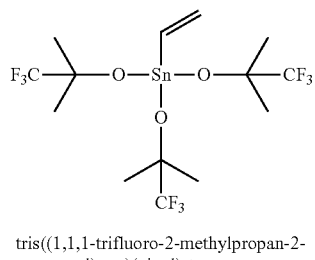

tris((1,1,1-trifluoro-2-methylpropan-2-yl)oxy)(vinyl)stannane

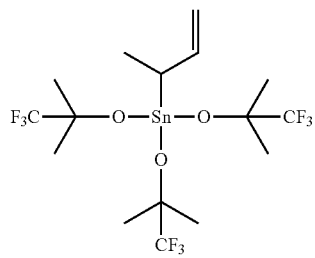

but-3-en-2-yltris((1,1,1-trifluoro-2-methylpropan-2-yl)oxy)stannane

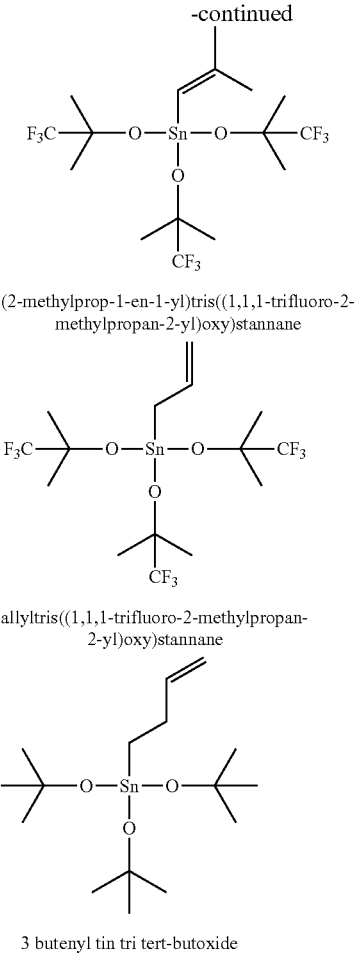

(2-methylprop-1-en-1-yl)tris((1,1,1-trifluoro-2-methylpropan-2-yl)oxy)stannane allyltris((1,1,1-trifluoro-2-methylpropan-2-yl)oxy)stannane 3 butenyl tin tri tert-butoxide Methods of Synthesis Aspects of the disclosure additionally relate to methods for synthesizing the high purity tin compounds having formula (1) as described above which are suitable for use in the microelectronic industry and which preferably contain low levels of diorgano tin compounds having formula (2). One method involves the reaction of an organotin trichloride with an alkali metal alkoxide (weak base) in controlled molar ratios and temperatures to introduce the water reactive alkoxide group to the tin moiety without affecting the unsaturated substituent. If desired, following initial purification, the level of diorgano tin compound and other minor impurities may be further reduced using fractional distillation.

$^{119}$Sn NMR spectroscopy is ideally suited to the quantitative analysis of monoorgano tin compounds (containing both alkenyl and alkynyl substituents) due to its high sensitivity to small structural changes and large spectral range of 6500 ppm (see Davies et al., Eds.; Tin Chemistry: Fundamentals, Frontiers, and Applications; Wiley (2008)). This allows for easy identification and quantification of monoorgano tin compounds and their impurities because [119]Sn resonances are highly resolved. $^{119}$Sn NMR suffers from reduced sensitivity compared to other analytical methods such as GC, HPLC, or $^1$H NMR. To improve sensitivity, monoorgano tin compounds are analyzed without dilution, and a large number of spectral acquisitions (2000+) are acquired to measure the low levels of impurities described in this work. Using this approach, detection limits of as low as 0.1 mol % diorgano tin dialkoxides can be achieved.

The $^{119}$Sn NMR data described herein were obtained using a method similar to the relative purity method described in *J. Med. Chem.* (57, 22, 9220-9231 (2014)). $^{119}$Sn NMR spectra were acquired using inverse-gated $^1$H decoupling with a 40° pulse, one second relaxation delay, and sufficient scans to achieve the required sensitivity. Samples were prepared without dilution in deuterated solvent. Quantitation was performed by integrating all peaks in the spectrum and setting the total peak area to 100. Each peak in the spectrum represents a distinct tin compound and the area of each peak represents the concentration or purity of that compound in mol %.

A method of synthesizing monoorgano tin trialkoxide compound having formula (1) according to aspects of the disclosure comprises reacting an alkali metal alkoxide with a R'SnX$_3$ compound, wherein X is a halogen atom or an alkoxy group.

Preferably, the method involves preparing a solution of an alkali metal alkoxide in an appropriate solvent, such as anhydrous hexanes, at a desired concentration, then cooling the solution to a low temperature, such as, without limitation at about 0° C. to about −10° C. for reaction with the R'SnX$_3$ compound. For example, if the desired compound having formula (1) is allyltris(t-butoxy)tin, the alkali alkoxide may be potassium t-butoxide, sodium t-butoxide, or lithium t-butoxide. The concentration of the alkali metal alkoxide is preferably up to about 10-15 wt % relative to the amount of solvent, more preferably about 8 to 10 wt %. The appropriate solvent and concentration may be determined by routine experimentation and based on commercial availability of the desired alkali metal alkoxide.

For the methods and steps described herein, preferred solvents include hydrocarbon solvents (such as, but not limited to, hexane, hexanes, heptane, and cyclohexane) and aromatic solvents (such as, but not limited to, toluene and xylene).

Appropriate R'SnX$_3$ compounds are those in which X is a halogen atom (such as fluoro, bromo, or the preferred chloro) or an alkoxy group (such as one containing about 1 to about 5 carbon atoms, such as the presently preferred methyl, ethyl, propyl, or butyl groups). Most preferably, the R'SnX$_3$ compound is R'SnCl$_3$. Following reaction of the alkali metal alkoxide with the R'SnX$_3$ compound, the reaction mixture is worked up and purified using methods well known in the art to produce the compound having formula (1).

In some embodiments, the method comprises:
(a) preparing a solution of an alkali metal alkoxide;
(b) adding R'SnCl$_3$ at about −10° C. to about 10° C., wherein the amount of alkali metal alkoxide is at least about 3.03 equivalents relative to the amount of added R'SnCl$_3$, to produce a crude product; and
(c) distilling the crude product to yield a monoorgano tin trialkoxide having formula (1).

These steps will be described in further detail below.

A further method for preparing a monoorgano tin trialkoxide compound having formula (1) according to further aspects of the disclosure involves the following steps, each of which is described in further detail below:
(a) preparing an alkali metal alkoxide solution;
(b) adding R'SnCl$_3$ at about −10° C. to about 10° C.; wherein the amount of alkali metal alkoxide is at least about 3.03 equivalents relative to the amount of added R'SnCl$_3$;
(c) warming the solution to room temperature;
(d) removing the alkali metal chloride salt byproduct to produce a crude product; and
(e) distilling the crude product to yield a product containing monoorgano tin trialkoxide having formula (1) and no more than about 5 mol % diorgano tin dialkoxide having formula (2).

The first step in the method involves preparing a solution of alkali metal alkoxide solution in an appropriate solvent, such as anhydrous hexanes, at a desired concentration, then cooling the solution to a low temperature, such as at about 0° C. to about −10° C. For example, if the desired compound having formula (1) is allyltris(t-butoxy)tin, the alkali alkoxide may be potassium t-butoxide, sodium t-butoxide, or lithium t-butoxide. The concentration of the alkali metal alkoxide is preferably up to about 10-15 wt % relative to the amount of solvent, more preferably about 8 to 10 wt %. The appropriate solvent and concentration may be determined by routine experimentation and based on commercial availability of the desired alkali metal alkoxide.

In the second step, a monoalkenyl or monoalkynyl tin trichloride R' SnCl$_3$ or other R'SnX$_3$ compound is added to the alkali metal alkoxide solution at about −10° C. to about 10° C., such that the amount of alkali metal alkoxide is at least about 3.03 equivalents relative to the amount of organo tin trichloride or organo tin trialkoxide added. The slight molar excess ensures complete reaction of the organotin trichloride or organotin trialkoxide. Preferably, the molar excess is maintained as close as possible to about 3% excess to avoid polymerization of the unsaturated group but it is also within the scope of the disclosure to employ a molar excess of about 2% to about 4% or 5% or as high as about 15% so that the metal alkoxide is present in an amount of about 3.02 to about 3.15 equivalents, preferably about 3.02 to about 3.05 equivalents, relative to the amount of tin trichloride (or tin trialkoxide) added. For example, allyl trichloro tin may be employed in the second step for the preparation of an allyl tin trialkoxide. The R'SnCl$_3$ compound may be purchased commercially or prepared, such as, for example, by the redistribution reaction of R'$_4$Sn and SnCl$_4$ to produce R'SnCl$_3$=.

The organotin trichloride or organotin trialkoxide is preferably added in a dropwise fashion to control the exothermic reaction. The second method step is preferably performed in an inert atmosphere, such as nitrogen or argon. The monoorgano tin trichloride or monoorgano tin trialkoxide is preferably added neat (without solvent) but it is also within the scope of the disclosure to add the monoorgano tin trichloride or monoorgano tin trialkoxide in a solvent such as, without limitation, hexanes, toluene, THF, xylenes, heptanes, dichloromethane, or benzene.

After completing the addition of organo tin trichloride or organo tin trialkoxide to the alkali metal alkoxide solution, the reaction mixture is allowed to slowly warm to room temperature, such as over a period of about four hours, and then stirred for an additional period of time at room temperature, such as for about two to four hours. The reaction mixture is then filtered, such as through celite, to remove the alkali metal chloride byproduct. Other means of filtration which are known in the art may also be employed. The resulting salt is then rinsed, such as with anhydrous hexanes, and the solvent is removed under reduced pressure by means known in the art to produce a crude product.

Finally, the crude product is distilled, such as at less than about 10 torr, preferably less than about 0.5 torr to yield the desired product containing monoorgano tin trialkoxide (such as allyltris(t-butoxy)tin) preferably having a purity of greater than about 95 mol % and no more than about 5 mol % diorgano tin dialkoxide. The appropriate distillation conditions may be determined on a case-by-case basis depending on the desired product using routine experimentation. In preferred embodiments, the content of diorgano tin dialkoxide is less than about 4 mol %, less than about 3 mol %, less than about 2 mol %, less than about 1 mol %, less than about 0.5 mol %, less than about 0.1 mol %, or even lower, as described above. Unlike methods of forming organotin trialkoxide compounds from the reaction of diethylamine followed by alcohol, which form mixtures of products due to comproportionation, the method described herein produces the desired product in high purity (containing low amounts of diorgano tin dialkoxide impurity) and yield.

All of the method steps are preferably performed substantially without light exposure. Shielding may be accomplished by any method known in the art such as, for example, employing light-shielded containers such as amber glass, metal (SUS) containers, wrapping the container with a light-shielding cover such as cloth, foil or film, using light-shielding coatings, or performing the reactions in a dark room.

The distillation may be performed using a stainless steel column packed with a stainless steel packing material. Alternatively, the distillation may be performed in a light-shielded apparatus comprising glass such as glass equipment, glass-lined equipment, glass-coated equipment, etc. Shielding may be accomplished by any method known in the art such as, for example, employing light-shielded containers such as amber glass, metal (SUS) containers, wrapping the container with a light-shielding cover such as cloth, foil or film, using light-shielding coatings, or performing the distillation in a dark room.

In preferred embodiments, the methods described herein are performed in a solvent containing greater than about 50% by volume of a hydrocarbon solvent and/or an aromatic solvent such as, without limitation, those exemplified above. In preferred embodiments, the methods described herein are performed substantially without light exposure. In preferred embodiments, the alkali metal alkoxide is dehydrated prior to reaction with the R'SnX$_3$ compound.

While performing the alkoxylation reaction to form monoorgano tin trialkoxides, the Kocheshkov-like comproportionation shown in scheme (I) above also occurs, and even low temperatures, such as from about −78° C. to 10° C., do not prevent the comproportionation reaction from occurring. Further, the electron donation could contribute to the Kocheshkov-like comproportionation and form up to 15 mol % diorgano tin alkoxides as determined by $^{119}$Sn NMR.

However, the method described herein provides a synthetic strategy for forming tin compounds having unsaturated substituents without substantial amounts of diorgano tin dialkoxide impurities. It has been found that lithium dimethylamide not only reacts with tin chloride but also with unsaturated bonds. Accordingly, as described herein, lithium dimethylamide is not employed, and the concentration of reactants is diluted, such as by employing a metal alkoxide in a hexane slurry at a concentration of not more than about 10 wt % to limit formation of the polyorgano tin compounds. Further, the temperature of the alkali alkoxide solution prior to and during addition of organo tin trichloride or organo tin trialkoxide is carefully controlled.

It is further within the scope of the disclosure to employ an alcohol R'OH (or a partially fluorinated alcohol) rather than the alkali metal alkoxide reactant for preparing the compounds having formula (1) as described herein, and further to employ a partially fluorinated alkoxide group in the alkali metal alkoxide reactant.

The addition of $CF_3$ groups to the alkoxide ligand may improve the volatility/vapor pressure of the resulting tin compounds in part because the fluorine atoms provide an increasing amount of intermolecular repulsion due to their high electronegativity relative to carbon. In addition, fluorine has reduced polarizability (as compared to hydrogen) which causes fluorinated ligands to have less intermolecular attractive interactions. Extending this concept, separation of unwanted by-products may also be simplified as the vapor pressure difference between $[CF_3(CH_3)CHO]_2SnR_2$, $[CF_3(CH_3)CHO]_3SnR$, and $[CF_3(CH_3)CHO]_4Sn$ would be greater than what is observed for the related tert-butoxide or amide derivatives. In general, fluorinated alkoxides are weaker donors/bases than standard alkoxides due to the electronegativity of the fluorine atoms. This means that the resulting tin compounds are less sensitive to residual moisture than the related alkoxy tin complexes but should still react with water under CVD conditions to deposit tin oxides. In addition to stability towards residual moisture, the weaker donation to tin from the fluorinated alkoxides may also serve to strengthen the tin-carbon bond and thus provide more stable tin alkenyl or alkynyl complexes. The fluorinated alkoxide is also much less likely to attack the double bond of the allyl group as it is less nucleophilic than an amide ligand.

Reduction of Additional Impurities

It is reasonable to presume that metallic impurities in organotin trialkoxy compounds are present as metal chlorides. If so, removal may be affected over an adsorbent, such as BASF CL-750, a chloride adsorbent known in the industry. Additional chloride impurities may be present, such as lithium chlorides which may be carried forward in the production process and become impurities of concern. Removal over a chloride-scavenging adsorbent, e.g., CL-750 or activated carbon may be effective for removal.

Storage

Further aspects of the disclosure relate to methods of storing monoorgano tin trialkoxide compounds having formula (1) as described herein. A method of storing a sample (such as, but not limited to a sample of more than about 0.5 kg) of a monoorgano tin trialkoxide compound having formula (1) as described herein comprises storing the sample of the monoalkyl tin triamide compound having formula (1) substantially without light exposure and at any temperature, such as a temperature of less than about 30° C. The method may involve storing the compound having formula (1) in a container in an inert atmosphere and/or storing the compound having formula (1) in a container without light exposure such as, for example, in a dark room, by employing a light-shielded container such as amber glass, metal (SUS), wrapping the container with a light-shielding cover such as cloth, foil or film, using light-shielding coatings, etc.

The sample of the monoorgano tin trialkoxide compound having formula (1) may be stored for up to about three days to about one year, such as about a week or longer, not more than about ten months, a period of about two to six weeks, and all intermediate times as desired. Preferably the sample is stored at a temperature of less than about 30° C., less than about 25° C., less than about 20° C., and preferably greater than about −10° C. "Substantively without light exposure" may be understood to mean that the sample is protected from light exposure to the greatest possible extent, such as by storage in an amber or stainless steel vessel or other means of light shielding as are known in the art and/or as described above. In embodiments, the sample of the monoorgano tin trialkoxide compound undergoes substantively no decomposition after a storage time of hours, up to about three days to about one year, or longer, as described above.

Additional Aspects of the Disclosure

The organometallic tin compounds having formula (1) have at least one unsaturated bond in the carbon chain connected to the tin atom. These tin compounds form oxostannate cluster films with unsaturated bonds on a silicon wafer after vapor phase deposition or spin-on coating processes. It has been found that these unsaturated bonds provide more radiation sensitive Sn—C bonds that can be used to pattern structures lithographically. These are advantageous for EUV photoresist because the orbital interaction of the unsaturated bond affects the Sn—C bonds or the electronic state of tin and photosensitivity can be higher as a result. Further, the unsaturated bond can be reacted or polymerized with EUV exposure and the solubility of the tin cluster will be improved.

The radicals and anions generated by EUV light react with the unsaturated bonds and polymerize to form stronger $R'SnO_{(3/2-x/2)}(OH)_x$ ($0<x<3$) films. The above reactions cause the $R'SnO_{(3/2-x/2)}(OH)_x$ ($0<x<3$) cluster film in the irradiated area to change greatly, resulting in a higher contrast as a resist.

Further aspects of the disclosure relate to organotin compounds having formula (3):

$$R'SnO_{(3/2-x/2)}(OH)_x \quad (3)$$

In formula (3), $0<x<3$ and R' is a linear or branched, optionally fluorinated, unsaturated hydrocarbon group having about 2 to about 20 carbon atoms. Such compounds having formula (3) may be obtained by hydrolysis of a monoorgano tin trialkoxide compound having formula (1) as described herein.

Additional aspects of the disclosure relate to solutions containing organotin compounds having formula (3) and an organic solvent such as, without limitation, a hydrocarbon solvent or an aromatic solvent as described above. Further aspects of the disclosure relate to films containing organotin compounds having formula (3) as described herein.

Further aspects of the disclosure relate to compositions or mixtures containing a monoorgano tin trialkoxide compound having formula (1) and $R'SnX_3$, where X is a halogen atom or an alkoxy group, as described above.

Additional aspects of the disclosure relate to a composition containing an organotin compound having formula (3) and an organotin compound having formula (4):

$$R'SnO_{(3/2-x/2)}(OH)_x \quad (3)$$

$$R''SnO_{(3/2-x/2)}(OH)_x \quad (4)$$

In formulas (3) and (4), $0<x<3$, R' is a linear or branched, optionally fluorinated, unsaturated hydrocarbon group having about 2 to about 20 carbon atoms and R'' is an optionally substituted hydrocarbon group having 2 to about 20 carbon atoms, such as a hydrocarbon group substituted with a halogen atom, an alkoxy group, or a dialkylamino group (such as dimethylamino, diethylamino, etc.). Such compounds having formula (3) and (4) may be obtained by hydrolysis of a monoorgano tin trialkoxide compound having formula (1) as described herein.

Further aspects of the disclosure relate to a solution containing an organic solvent as described herein and a composition containing organotin compounds having formula (3) and formula (4), which may, in some embodiments, be obtained by hydrolysis of a monoorgano tin trialkoxide compound having formula (1) as described herein. Additional aspects of the disclosure relate to films prepared from or containing a composition containing organotin compounds having formula (3) and (4).

The R' and R'' groups described herein have a hydrocarbon group of about 2 to about 20 carbons as a backbone, and, in addition to the substituents specified above, may have various organic substituents provided they do not react with unsaturated carbon-carbon bonds or hydrolyzable Sn—O bonds in the molecule. For example, halogen atoms, alkoxy groups, aryloxy groups, dialkylamino groups, diarylamino, alkylthio groups, arylthio groups, acyl groups, acyloxy groups, and alkoxycarbonyl groups may be included as such organic substituents.

The compounds described herein may be used as a resist material after hydrolysis or other reactions such as those known in the art. The compounds described herein may contain a group which is capable of forming an alkyltin oxo-hydroxo-patterning composition which can be hydrolyzed with water or other suitable reagents under suitable conditions to form an alkyltin oxo-hydroxo-patterning composition which can be represented by the formula $R'SnO_{(3/2-x/2)}(OH)_x$ ($0<x\leq3$). Hydrolysis and condensation reactions that can alter a compound with hydrolytic groups (X) are shown in the following reactions:

$$RSnX_3 + 3H_2O \rightarrow RSn(OH)_3 + 3HX$$

$$RSn(OH)_3 \rightarrow RSnO_{(1.5-(x/2))}OHx + (x/2)H_2O$$

Alkyl oxohydroxy tin compounds obtained by hydrolysis using a composition containing $R'SnX_3$ compounds as described above as raw material and the oxohydroxy tin compounds represented by the formula $R'SnO_{(3/2-x/2)}(OH)_x$ ($0<x<3$) may be used as an EUV resist material.

A method for obtaining oxohydroxy tin compounds (R'SnO) by hydrolyzing a composition containing a $R'SnX_3$ compound may involve, for example, volatilizing a composition containing a $R'SnX_3$ compound under heating or reduced pressure, and reacting the vapor generated by volatilizing the composition on a substrate on which the tin composition is deposited, with water vapor, etc. (a dry method). In this method, a thin film containing the tin compound R'SnO may be formed on the substrate.

Another method may involve reacting a composition containing a $R'SnX_3$ compound in solution or in a solid state with water, etc., and hydrolyzing it to obtain the oxohydroxy tin compounds (R'SnO). The oxohydroxy tin compounds (R'SnO) may then be used as a coating solution by dissolving it in an organic solvent, for example.

The solution may be applied to a substrate by any coating or printing technique, and a thin film or coating containing oxohydroxy tin compounds (R'SnO) may be formed on the substrate.

The thin film obtained by any of the above methods may be stabilized or partially condensed prior to light irradiation through drying, heating, or other processes. Generally, thin films or coatings have an average thickness of less than about 10 microns, and very thin submicron thin films, e.g., less than about 100 nanometers (nm), even less than about 50 nm or less than about 30 nm, may be desirable for patterning very small features. The resulting thin film or coating may be called a resist because the exposure processes a portion of the composition to be resistant to development/etching.

The thin or coating may be exposed to appropriate radiation, (e.g., extreme ultraviolet, electron beam, or ultraviolet), using a selected pattern or negative portion of the pattern to form a latent image with developer resistant and developer soluble regions. After exposure to the appropriate radiation and prior to development, the thin film or coating may be heated or otherwise reacted to further differentiate the latent image from the non-irradiated areas. The latent image is brought into contact with the developer to form a physical image, i.e., a patterned thin film or coating. The patterned thin film or coating may be further heated to stabilize the remaining patterned coating on the surface. The patterned coating may be used as a physical mask to perform further processing according to the pattern, e.g., etching of the substrate and/or attachment of additional materials. After the patterned resist is used as requested, the remaining patterned coating may be removed at an appropriate point in the processing, but the patterned coating may also be incorporated into the final structure.

The invention will now be described in connection with the following, non-limiting examples.

EXAMPLE 1

Synthesis of Vinyltris(t-butoxy)tin

Vinyl tin trichloride was prepared according to the method of Rosenberg and Gibbons (*JACS*, 79, 2138-40 (1957)) by the redistribution reaction of tertavinyltin and tetrachlorotin. In a 5.0 L flask were placed 189.08 g. (0.75 moles) of vinyl tin trichloride and 400 ml of anhydrous hexanes (3 moles). To this was added, with good stirring and over a 1 hour period, 2.25 L (2.25 mole) of t-BuOK (1M in THF) at a pot temperature of −10° C. The solution was warmed to room temperature and stirred for an additional 2 hours. The mixture was filtered through celite under $N_2$ and washed with an additional 200 ml hexanes twice. The solvent was removed under reduced pressure, and the residue was distilled under reduced pressure (129° C., 0.5 torr) to yield 128 g (47%) of vinyl tris(t-butoxy)tin. $^{119}$Sn NMR (400 mHz; neat): δ −256.87. $^1$H NMR (400 mHz; $C_6D_6$): δ 5.8-6.2 (m. 3H, vinyl), δ 1.42 (s, 27H, Ot-Bu). Purity: 79%.

EXAMPLE 2

Synthesis of Allyltris(t-butoxy)tin

Allyl tin trichloride was prepared according to method of Rosenberg and Gibbons (*JACS*, 79, 2138-40 (1957)) by the redistribution reaction of tetraallyltin and tetrachloro tin in benzene or toluene. In a 5.0 L flask were placed 252.47 g (2.25 mole) of t-BuOK and 3.5 L of hexanes (26 mol) and cooled to 0° C. 189.08 g (0.75 moles) of allyl tin trichloride was added dropwise while maintaining the pot temperature at 0 to 10° C. After addition, the solution was warmed to room temperature and stirred for an additional 2 hours. The mixture was filtered through celite under $N_2$ and washed with an additional 200 ml hexanes twice. The solvent was removed under reduced pressure, and the diallyl tin impurity residue was removed by fractional distillation under reduced pressure. The allyltris(t-butoxy)tin was collected at 53.0-55.0° C. at 0.18 torr. $^{119}$Sn NMR (400 mHz; neat): δ −222.084. $^1$H NMR (400 mHz; $C_6D_6$): δ 5.7-5.9 (m. 1H), δ 4.8-5.0 (m, 2H), δ 2.1 (d, 2H), δ 1.42 (d, 2H), δ 1.40 (S 27H). Purity: 81%.

EXAMPLE 3

Synthesis of Allyltris((1,1,1-trifluoro-2-methylpropan-2-yl)oxy)stannane

Allyltin trichloride was prepared according to the method of Rosenberg and Gibbons (*JACS*, 79, 2138-40 (1957)) by the redistribution reaction of tetraallyltin and tetrachlorotin. A 2.5 M solution of n-butyl lithium in hexanes (230 g, 0.83 mol) was charged into a 2L flask and cooled to −30° C. To this solution 2-trifluoromethyl-2-propanol (100 g, 0.78 mol) was added dropwise over the course of 30 min resulting in a vigorous exothermic reaction. The reaction temperature was maintained below 5° C. over the course of the addition, during which time an orange solution and some white solids formed. The reaction was warmed to room temperature, the walls of the reactor were rinsed with hexanes (300 g), and the reaction was stirred for an additional 2 h. After stirring at room temperature, the reaction mixture was cooled to −10° C. and a solution of allyltrichlorotin (69 g, 0.26 mol) in toluene (150 g) was added to the reaction mixture in portions over the course of 10 min, during which time the orange solution became a light-yellow color and a white precipitate formed. The reaction mixture was warmed to room temperature and stirred for 16 h. The resulting light-yellow solution was isolated by filtration and the solvent was removed from the filtrate under vacuum with gentle heating (5 torr, 35° C.) giving a viscous yellow liquid. The product was isolated as a colorless liquid after distillation. Yield=40 g (30%): bp 65° C. at 0.5 torr. $^1$H NMR (benzene-$d_6$): δ 1.30 (s, 18H, $OC(CH_3)_2CF_3$), δ 2.15 (d, 2H, $SnCH_2CHCH_2$), δ 4.86 (m, 2H, $SnCH_2CHCH_2$), δ 5.57 (m, 1H, $SnCH_2CHCH_2$). $^{119}$Sn{$^1$H} NMR: δ −253. Purity: >97%.

EXAMPLE 4

Synthesis of 3-buten-1-yltris(t-butoxy)tin 3-buten-1-yltintrichloride was prepared according to the method of Jousseaume, Lehcini, and Rascle (*Organometallics* 14, 685-689 (1995)) by the redistribution reaction of 3-buten-1-yltricycolohexyltin and tetrachlorotin or the reaction of 3-buten-1-yltripheny-1-tin and tetrachlorotin in toluene. In a 3.0 L flask were placed 850.0 g (3.07 moles) of n-hexyl lithium under $N_2$ and cooled to 0° C. A premix containing 57.43 g (0.62 mole) of toluene and 229.71 g (3.10 moles) of tert-butanol was added dropwise while maintaining the pot temperature at 0 to 10° C. The mixture was warmed to room temperature and stirred for an additional 2 hours before 3-buten-1-yltintrichloride was added dropwise at 0 to 10° C. The reaction was warmed to room temperature and stirred overnight. The mixture was filtered through celite under $N_2$ and washed with an additional 200 ml hexanes twice. The solvent was removed under reduced pressure, and the target compound was collected at 59.4-62.8° C. at 0.4 torr to yield 3-buten-1-yltris(t-butoxy)tin. $^{119}$Sn NMR (400 mHz; neat): δ −194.423. $^1$H NMR (400 mHz; $C_6D_6$): δ 5.7-5.9 (m. 1H), δ 4.8-5.0 (m, 2H), δ 2.1 (d, 2H), δ 1.42 (d, 2H), δ 1.40 (S 27H). Purity>99%.

EXAMPLE 5 (PROPHETIC)

Preparation of Mixtures

Three mixtures are prepared as follows: (a) a mixture containing the compound prepared in Example 1 and a compound $RSnX_3$ where R is an vinyl group and X is a halogen atom or alkoxy group; (b) a mixture containing the compound prepared in Example 2 and a compound $RSnX_3$, where R is an allyl group and X is a halogen atom or alkoxy group; and (c) a mixture containing the compound prepared in Example 4 and $RSnX_3$, where R is 3-buten-1-yl and X is a halogen atom or alkoxy group.

EXAMPLE 6

Preparation and Analysis of R'SnO(3/2-x/2)(OH)x Compounds (where 0<x<3) by Hydrolysis Example 6-a: R'=Vinyl To a 100-mL flask under an inert gas atmosphere were added 10 mL n-hexane (dehydrated) and 1.0 g vinyltris(t-butoxy)tin, which was synthesized as described in Example 1, and dissolved with stirring at 150 rpm. After cooling the resulting solution to 0-10° C., demineralized water (1.0 mL, resistance 18.2 MΩ) was added by syringe over 10 minutes while stirring at 150 rpm and maintaining a temperature of 0-10° C. to form a suspension. The resulting suspension was filtered through a funnel (Kiriyama filter paper 5B) to obtain a white solid. The resulting white solid was washed with 3 mL of demineralized water and then dried in vacuo at 40° C. for 8 h. The resulting white solid (SnO-1) weighed 0.48 g.

Example 6-b; R'=Allyl

A white solid (SnO-2) in an amount of 0.47 g was obtained from allyltris(t-butoxy)tin (prepared as described Example 2) using a similar method to that described in Example 6-a.

Example 6-c; R'=3-buten-1-yl

A white solid (SnO-3) in an amount of 0.53 g was obtained from 3-buten-1-yltris(t-butoxy)tin (prepared as described in Example 4) using a similar method to that described in Example 6-a.

SnO-3 was identified by NMR. Only two peak groups were observed by $^{119}$Sn NMR (600 MHz, MeOD/CDCl$_3$ 1/1): 5-coordinated (R'SnO$_4$): −280~−296 ppm and 6-coordinated (R'SnO$_5$): −450~−490 ppm. $^1$H NMR (600 MHz MeOD/CDCl$_3$ 1/1): 5.7-5.9 (m. 1H), 4.8-5.2 (m, 2H), 2.1-2.8 (m, 2H), 0.8-1.6 (m, 2H). This correlates with the NMR results of a tin dodecamer cluster [(R'Sn)$_{12}$O$_{14}$(OH)$_6$] reported in *Organometallics* 19, 1940-1949 (2000). The ESI-Mass spectrum is shown in FIG. 1 (system: Waters Xevo G2-XS Qtof, solvent CH$_3$CN, mode: ESI positive), indicating 2 main peaks [(C$_4$H$_7$Sn)$_{12}$O$_{14}$(OH)$_{10}$] monovalent ion m/z=2480, divalent ion m/z=1240. Accordingly, a compound corresponding to R'SnO$_{(3/2-x/2)}$(OH)X (where 0<x<3) was obtained.

Example 6-d: R'=3-buten-1-yl

A white solid (SnO-4) in an amount of 0.37 g was obtained from 0.3 g of 3-buten-1-yltris(t-butoxy)tin (prepared as described in Example 4) and 0.7 g isopropyl tris(dimethylamino)tin using the same method described in Example 6-a.

EXAMPLE 7

Preparation of Film

The SnO-3 of Example 6-c was dissolved in 4-methyl-2-pentanol (5 mL) to a concentration of 2.0 wt % while using ultrasonic waves, and the resulting solution was filtered through a 0.45 um syringe filter to obtain a resist solution containing a transparent tin compound. Silicon wafers with oxide surfaces (Si substrate, 100 mm diameter) were ozonated and used as substrates for resist thin film deposition. The surface of the Si substrate was treated with hexamethyldisilazane (HMDS) vapor prior to resist deposition. The resist solution was spin-coated onto the substrate at 2000 rpm and baked on a hot plate at 90° C. for 2 minutes. The film thickness after coating and baking was measured by ellipsometer to be 20 nm.

EXAMPLE 8 (PROPHETIC)

Formation of Image on Substrate

The coated substrate (film) from Example 7 is exposed to ultraviolet light (light source: xenon excimer lamp (172 nm, 7.2 eV) manufactured by USHIO INC., light source intensity: 0.7 mW/cm$^2$) using a pattern to project a pattern on the substrate. The substrate is then immersed in 2-heptanone for 15 seconds and rinsed with the same developer for another 15 seconds to form a negative-type image, i.e., an image in which the unexposed portion of the thin film is removed and only the pattern-exposed portion remains.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A monoorgano tin trialkoxide compound having formula (1) having a purity of at least about 95 mol % and containing less than about 5 mol % of a diorgano tin dialkoxide compound having formula (2):

R'Sn(OR)$_3$         (1)

R'$_2$Sn(OR)$_2$         (2)

wherein R' is a linear or branched, optionally fluorinated, unsaturated hydrocarbon group having about 2 to about 20 carbon atoms and each R is independently a linear or branched, fluorinated, alkyl group having about 1 to about 10 carbon atoms.

2. The monoorgano tin trialkoxide compound according to claim 1, wherein R' is a linear or branched, optionally fluorinated, unsaturated hydrocarbon group having 2 to about 10 carbon atoms and each R is independently a linear or branched, fluorinated, alkyl group having about 1 to about 5 carbon atoms.

3. The monoorgano tin trialkoxide compound according to claim 1, wherein the content of diorgano tin dialkoxide having formula (2) is less than about 1 mol %.

4. The monoorgano tin trialkoxide compound according to claim 1, wherein a total content of tetrakis(alkoxy)tin is less than about 1 mol %.

5. The monoorgano tin trialkoxide compound according to claim 1, wherein a total content of tris(alkenyl)tin compounds is less than about 1 mol %.

6. The monoorgano tin trialkoxide compound according to claim 1, wherein R' is vinyl, allyl, 1-propenyl, 3-buten-1-yl, 3-buten-2-yl, 2-methyl allyl, or 3-methyl-2-buten-1-yl and each R is independently fluorinated methyl, ethyl, n-propyl, isopropyl, n-butyl, isobutyl, or t-butyl.

7. The monoorgano tin trialkoxide compound according to claim 1, wherein the compound having formula (1) is selected from:

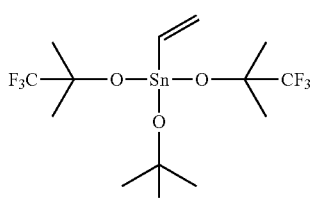

tris((1,1,1-trifluoro-2-methylpropan-2-yl)oxy)(vinyl)stannane

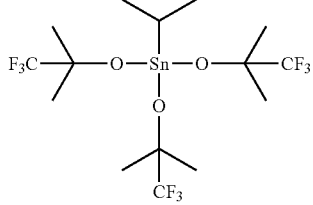

but-3-en-2-yltris((1,1,1-trifluoro-2-methylpropan-2-yl)oxy)stannane

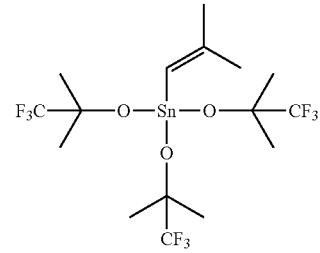

(2-methylprop-1-en-1-yl)tris((1,1,1-trifluoro-2-methylpropan-2-yl)oxy)stannane

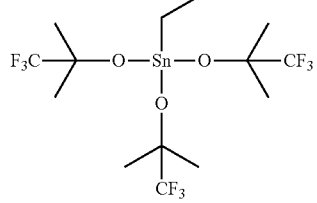

allyltris((1,1,1-trifluoro-2-methylpropan-2-yl)oxy)stannane

8. A monoorgano tin trialkoxide compound having formula (1):

R'Sn(OR)₃      (1)

wherein R' is a linear or branched, optionally fluorinated, unsaturated hydrocarbon group having about 2 to about 20 carbon atoms and each R is independently a linear or branched, fluorinated, alkyl group having about 1 to about 10 carbon atoms.

9. The monoorgano tin trialkoxide compound according to claim 8, wherein R' is a linear or branched, optionally fluorinated, unsaturated hydrocarbon group having 2 to about 10 carbon atoms and each R is independently fluorinated, linear or branched alkyl group having about 1 to about 5 carbon atoms.

10. The monoorgano tin trialkoxide compound according to claim 8, wherein R' is vinyl, allyl, 1-propenyl, 3-buten-1-yl, 3-buten-2-yl, 2-methyl allyl, or 3-methyl-2-buten-1-yl and each R is independently fluorinated methyl, ethyl, n-propyl, isopropyl, n-butyl, isobutyl, or t-butyl.

11. The monoorgano tin trialkoxide compound according to claim 8, wherein the compound having formula (1) is selected from:

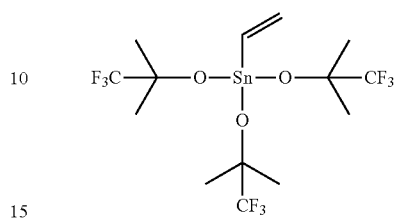

tris((1,1,1-trifluoro-2-methylpropan-2-yl)oxy)(vinyl)stannane

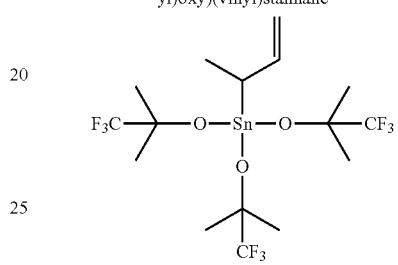

but-3-en-2-yltris((1,1,1-trifluoro-2-methylpropan-2-yl)oxy)stannane

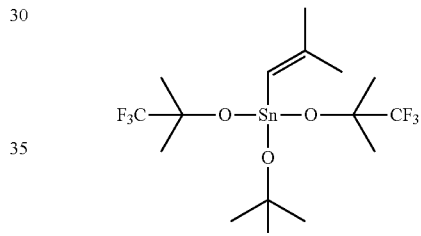

(2-methylprop-1-en-1-yl)tris((1,1,1-trifluoro-2-methylpropan-2-yl)oxy)stannane

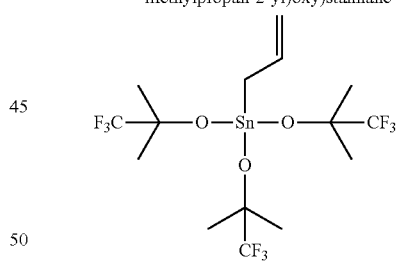

allyltris((1,1,1-trifluoro-2-methylpropan-2-yl)oxy)stannane

12. A method of synthesizing a monoorgano tin trialkoxide compound having formula (1) having a purity of at least about 95 mol % and containing less than about 5 mol % of a diorgano tin dialkoxide compound having formula (2):

R'Sn(OR)₃      (1)

R'₂Sn(OR)₂      (2)

wherein R' is a linear or branched, optionally fluorinated, unsaturated hydrocarbon group having about 2 to about 20 carbon atoms and each R is independently a linear or branched, fluorinated, alkyl group having about 1 to about 10 carbon atoms, the method comprising reacting an alkali metal alkoxide with a R'SnX₃ compound, wherein X is a halogen atom or an alkoxy group.

13. The method according to claim 12, comprising:
(a) preparing a solution of an alkali metal alkoxide;
(b) adding R'SnCl₃ at about −10° C. to about 10° C., wherein the amount of alkali metal alkoxide is at least about 3.03 equivalents relative to the amount of added R'SnCl₃, to produce a crude product; and
(c) distilling the crude product to yield a product containing monoorgano tin trialkoxide having formula (1) and no more than about 5 mol % diorgano tin dialkoxide having formula (2).

14. The method according to claim 12, wherein the content of diorgano tin dialkoxide having formula (2) is less than about 1 mol %.

15. The method according to claim 12, wherein a total content of tetrakis(alkoxy)tin is less than about 1 mol %.

16. The method according to claim 12, wherein R' is vinyl, allyl, 1-propenyl, 3-buten-1-yl, 3-buten-2-yl, 2-methyl allyl, or 3-methyl-2-buten-1-yl and each R is independently fluorinated methyl, ethyl, n-propyl, isopropyl, n-butyl, isobutyl, or t-butyl.

17. The method according to claim 12, wherein the reaction is performed in a solvent containing greater than about 50% by volume of a hydrocarbon solvent and/or an aromatic solvent.

18. The method according to claim 12, wherein the reaction is performed substantially without light exposure.

19. A method of synthesizing a monoorgano tin trialkoxide compound having formula (1) having a purity of at least about 95 mol % and containing less than about 5 mol % of a diorgano tin dialkoxide compound having formula (2):

R'Sn(OR)₃     (1)

R'₂Sn(OR)₂     (2)

wherein R' is a linear or branched, optionally fluorinated, unsaturated hydrocarbon group having about 2 to about 20 carbon atoms and each R is independently a linear or branched, fluorinated, alkyl group having about 1 to about 10 carbon atoms, the method comprising reacting an alkali metal alkoxide with a R'SnX₃ compound, wherein X is a halogen atom or an alkoxy group.

20. The method according to claim 19, comprising:
(a) preparing a solution of an alkali metal alkoxide;
(b) adding R'SnCl₃ at about −10° C. to about 10° C., wherein the amount of alkali metal alkoxide is at least about 3.03 equivalents relative to the amount of added R'SnCl₃, to produce a crude product; and
(c) distilling the crude product to yield a monoorgano tin trialkoxide having formula (1).

21. The method according to claim 19, wherein R' is vinyl, allyl, 1-propenyl, 3-buten-1-yl, 3-buten-2-yl, 2-methyl allyl, or 3-methyl-2-buten-1-yl and each R is independently fluorinated methyl, ethyl, n-propyl, isopropyl, n-butyl, isobutyl, or t-butyl.

22. The method according to claim 19, wherein the reaction is performed in a solvent containing greater than about 50% by volume of a hydrocarbon solvent and/or an aromatic solvent.

23. The method according to claim 19, wherein the method is performed substantially without light exposure.

24. A method of storing a sample of the monoorgano tin trialkoxide compound having formula (1) according to claim 1, the method comprising storing the sample of the monoorgano tin trialkoxide compound having formula (1) substantively without light exposure and at a temperature of less than about 30° C.

25. The method according to claim 24, wherein the sample of the monoorgano tin trialkoxide compound having formula (1) is stored for about three days to about one year.

26. The method according to claim 24, wherein the sample of the monoorgano tin trialkoxide undergoes substantively no decomposition after a storage time of about three days to about one year.

27. The method according to claim 24, comprising storing the compound having formula (1) in a container in an inert atmosphere.

28. The method according to claim 24, comprising storing the compound having formula (1) in a container substantially without light exposure.

29. A method of storing a sample of the monoorgano tin trialkoxide compound having formula (1) according to claim 8, the method comprising storing the sample of the monoorgano tin trialkoxide compound having formula (1) substantively without light exposure and at a temperature of less than about 30° C.

30. The method according to claim 29, comprising storing the compound having formula (1) in a container in an inert atmosphere.

* * * * *